United States Patent [19]

Kawai et al.

[11] Patent Number: 5,349,826
[45] Date of Patent: Sep. 27, 1994

[54] AIR CONDITIONING APPARATUS FOR AUTOMOTIVE VEHICLE

[75] Inventors: Nobuyuki Kawai, Fujisawa; Ikutaro Noji, Yokohama; Makoto Fukubayashi, Isehara, all of Japan

[73] Assignee: Nissan Motor Company, Ltd., Yokohama, Japan

[21] Appl. No.: 115,080

[22] Filed: Sep. 2, 1993

[30] Foreign Application Priority Data

Sep. 21, 1992 [JP] Japan .................. 4-250300

[51] Int. Cl.⁵ ............................... B60H 1/32
[52] U.S. Cl. ...................... 62/133; 62/228.4; 62/243; 123/339
[58] Field of Search ............ 62/133, 228.1, 228.4, 62/228.5, 323.1, 323.4, 226, 227, 229, 208, 243, 239, 215; 123/339; 165/43; 236/91 C, 91 F, 91 R

[56] References Cited

U.S. PATENT DOCUMENTS

| | | | |
|---|---|---|---|
| 4,289,100 | 9/1981 | Kinugawa et al. | 62/323.1 X |
| 4,488,411 | 12/1984 | Hara | 62/133 |
| 4,856,291 | 8/1989 | Takahashi | 62/228.4 |
| 4,898,005 | 2/1990 | Sakurai | 62/323.4 |
| 4,926,651 | 5/1990 | Noguchi | 62/323.13 X |
| 5,018,362 | 5/1991 | Nagase et al. | 62/323.1 X |
| 5,199,272 | 4/1993 | Yamanaka et al. | 62/133 |
| 5,216,895 | 6/1993 | Kawai et al. | 62/133 |

OTHER PUBLICATIONS

Nissan Service Weekly, Jun. 1987, No. 578, pp. B-68 to B-71.

Primary Examiner—Harry B. Tanner
Attorney, Agent, or Firm—Lowe, Price, Leblanc & Becker

[57] ABSTRACT

An air conditioning apparatus for an automotive vehicle comprises: a compressor (102) driven by an engine (101) for compressing a refrigerant; an evaporator (103) for evaporating the refrigerant compressed by the compressor; engine speed commanding section (104) for outputting a first command signal to drive the engine at a first engine idle speed when the compressor is not actuated and outputting a second command signal to drive the engine at a second engine idle speed higher than the first engine idle speed when the compressor is actuated; an after-evaporator temperature sensor (105) for detecting air temperature Immediately after the evaporator; an external air temperature sensor (106) for detecting external air temperature; and an inhibiting section (107) for inhibiting the engine speed commanding section from outputting the second command signal, when after-evaporator temperature is lower than a predetermined temperature and further external air temperature is lower than another predetermined temperature, irrespective of whether the compressor is actuated or not. The air conditioning apparatus can control engine idle speed without use of any timer and without deteriorating fuel consumption rate.

4 Claims, 4 Drawing Sheets

AIR CONDITIONING APPARATUS FOR AUTOMOTIVE VEHICLE

TECHNICAL FIELD

The present invention relates to an air conditioning apparatus for an automotive vehicle, and more specifically to an air conditioning apparatus for controlling engine idle speed without use of any timer and without increasing fuel consumption rate.

BACKGROUND ART

There is well known an air conditioning apparatus for an automotive vehicle, which comprises a compressor driven by an engine to compress an refrigerant, an evaporator for evaporating the refrigerant compressed by the compressor, and a blower fan for blowing introduced external air into a vehicle room through the evaporator. In an automotive vehicle on which the conventional air conditioning apparatus as described above is mounted, when the compressor is being actuated, the engine idle speed is increased by opening an AAC (auxiliary air control) valve by a constant opening rate. This AAC valve is usually disposed in an air passage bypassing a throttle valve, to adjust the flow rate of auxiliary air, for instance (as disclosed by NISSAN Service Weekly, June 1987, No. 578, B69 to 71 page).

In this specification, the status in which the compressor is being actuated implies a status in which the compressor is feeding the refrigerant, and the status in which the compressor is being not actuated implies a status in which the compressor is feeding almost no refrigerant. Accordingly in the case of a variable volume compressor, if the amount of refrigerant to be fed is zero in spite of the face that the compressor Is being actuated, the compressor is regarded as being not actuated.

In the automotive vehicle provided with the air conditioning apparatus as described above, even when the thermal load within the vehicle room is low, once the compressor is actuated, the engine idle speed is increased unconditionally. In the case where the thermal load is not high, however, since sufficient cooling performance can be usually obtained without increasing engine idle speed to increase the amount of refrigerant to be fed, there exists a problem in that an increase of the engine idle speed inevitably deteriorates the fuel consumption rate.

SUMMARY OF THE INVENTION

Accordingly, the object of the present invention is to provide an air conditioning apparatus for an automotive vehicle, which can control engine idle speed without deteriorating fuel consumption rate.

To achieve the above-mentioned object, the present invention provides an air conditioning apparatus for an automotive vehicle, which comprises: a compressor driven by an engine, for compressing a refrigerant; an evaporator for evaporating the refrigerant compressed by said compressor; engine speed commanding means for outputting a first command signal to drive the engine at a first engine idle speed when said compressor is not actuated, and outputting a second command signal to drive the engine at a second engine idle speed higher than the first engine idle speed when said compressor is actuated; an after-evaporator temperature sensor for detecting air temperature immediately after said evaporator; an external air temperature sensor for detecting external air temperature; and inhibiting means for inhibiting said engine speed commanding means from outputting the second command signal, when air temperature detected by said after-evaporator temperature sensor is lower than a predetermined temperature and further external air temperature detected by said external temperature sensor is lower than another predetermined temperature, irrespective of whether said compressor is actuated or not.

Further, the air conditioning apparatus according to the present invention further comprises: means for detecting internal air temperature; means for detecting quantity of solar radiation; means for setting a required room temperature; means for calculating vehicle thermal load on the basis of the detected external and internal air temperatures, after-evaporator temperature and solar radiation, and the set required room temperature; and wherein said engine speed commanding means outputs a third command signal to drive the engine at a third engine idle speed higher than the second engine idle speed, when said compressor is actuated and further a calculated vehicle thermal exceeds a predetermined value.

Further, to achieve the above-mentioned object, the present invention provides a method of controlling air temperature within a vehicle room, which comprises the steps of: checking whether a compressor is actuated or not; if the compressor is not actuated, setting engine idle speed to a first engine idle speed $N_1$; if the compressor is actuated, detecting after-evaporator temperature Tint; comparing the detected after-evaporator temperature with a predetermined value; if the detected after-evaporator temperature is higher than the predetermined value, setting engine idle speed to the second engine idle speed $N_2$ higher that the first engine idle speed; if the detected after-evaporator temperature is equal to or lower than the predetermined value; detecting external air temperature Tamb; comparing the detected external air temperature with another predetermined value; if the detected external air temperature is higher than the predetermined value, setting engine idle speed to the second engine idle speed $N_2$; and if the detected external air temperature is lower than the predetermined value, setting engine idle speed to the first engine idle speed, $N_1$ even if the compressor is being actuated.

Further, the method of controlling air temperature within a vehicle room further comprises the steps of: detecting internal air temperature; detecting quantity of solar radiation; setting a required room temperature; calculating vehicle thermal load on the basis of the detected external and internal air temperatures, after-evaporator temperature and solar radiation, and the set required room temperature; comparing the calculated vehicle thermal load with a predetermined value; if the calculated vehicle thermal load is higher than the predetermined value, setting engine idle speed to a third engine idle speed higher than the second engine idle speed, as far as the compressor is being actuated.

In the air conditioning apparatus according to the present invention, when the after-evaporator temperature is lower than a predetermined value and further the external air temperature is lower than another predetermined value, the engine idle speed is controlled to a lower speed the same as when the compressor is not actuated, even if the compressor is being actuated.

This is because the fact that the after-evaporator temperature is lower than a predetermined value indicates that a time has elapsed after the compressor has been actuated and the cooling conditions become stable. Therefore, as far as the external air temperature is lower than another predetermined value, no strong cooling power may be unnecessary, so that the engine idle speed is not increased even if the compressor is being actuated.

Further, when the vehicle thermal load exceeds a predetermined value, the engine idle speed is further increased to the third speed higher than the second speed, to obtain a sufficient cooling power under high thermal load conditions:.

BRIEF DESCRIPTION OF THE DRAWINGS

FIG. 8 is a flowchart for assistance in explaining the procedure of controlling engine idle speed.

DETAILED DESCRIPTION OF THE PREFERRED EMBODIMENTS

Figure 1:
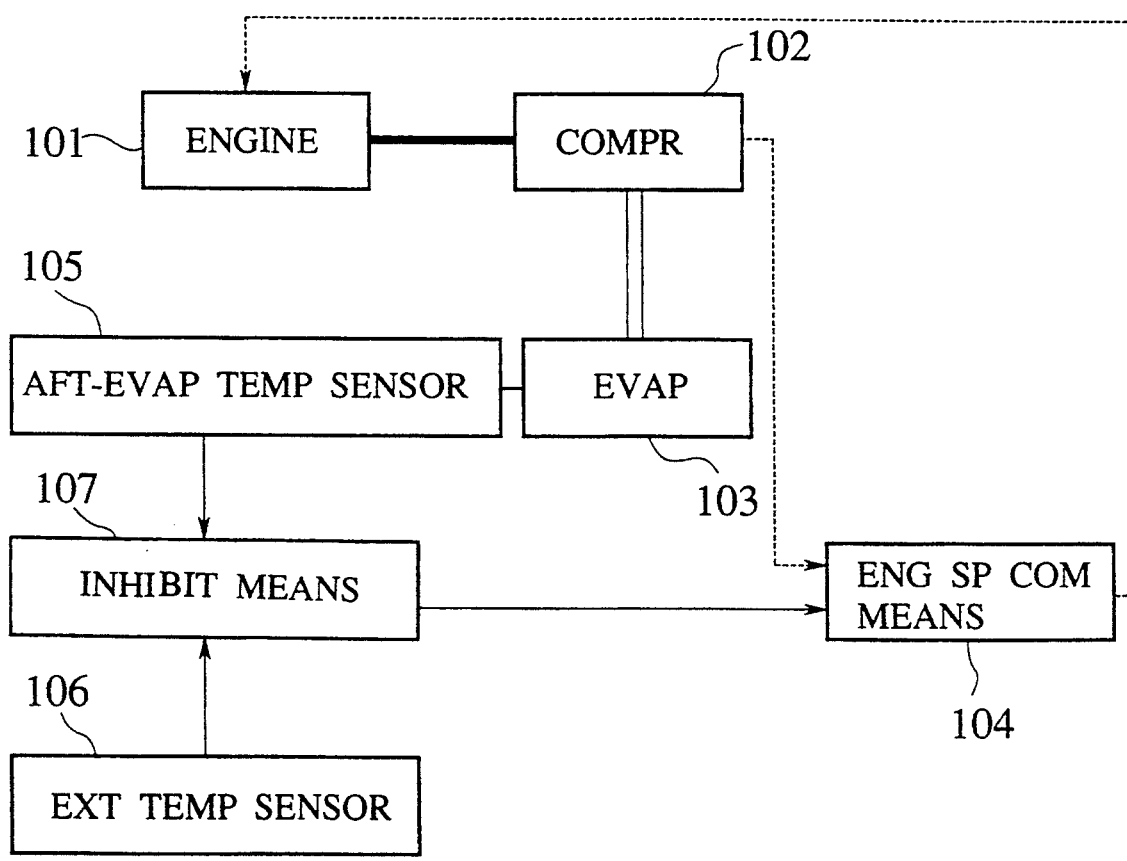
FIG. 1 is a block diagram showing the basic concept of the air conditioning apparatus according to the present invention.

In the automotive vehicle provided with the air conditioning apparatus as described already under the Background Art, even when the thermal load within the vehicle room is low, once the compressor is actuated, the engine idle speed is unconditionally increased. Therefore, in the case of where the thermal load is not high, there exists a problem in that an increase of the engine idle speed inevitably deteriorates the fuel consumption rate. To overcome the above-mentioned problem, the same applicant has already proposed an engine idle speed control apparatus which can prevent fuel consumption rate from being deteriorated when the thermal load is low, as disclosed in Japanese Patent Application No. 8-261141 or U.S. Pat. No. 5,216,895.

In the apparatus proposed by the same Applicant, air temperature immediately after the evaporator (referred to as after-evaporator air temperature, hereinafter) is detected. When this after-evaporator air temperature is lower than a predetermined air temperature, the compressor is not actuated, and when higher than the predetermined air temperature, the compressor is actuated. Further, when the time period during which the after-evaporator air temperature is lower than the predetermined temperature, that is, when the time period during which the compressor is not actuated is longer than a predetermined time, since this indicates that the thermal load is low, the engine idle speed is not increased even if the compressor is being actuated; that is, the engine idle speed is kept at the value same as when the compressor is not actuated.

In the already proposed method as described above, however, a timer is required to measure the time during which the compressor is kept non-actuated, an additional processing is required to turn on or off the timer and further to measure the timer, thus causing a problem in that the control processing is rather complicated and thereby the cost thereof increases.

Accordingly, the object of the present invention is to provide an air conditioning apparatus for an automotive vehicle which can control engine idle speed without using timer means and without deteriorating fuel consumption rate.

The basic concept of the present invention will be first described hereinbelow with reference to FIG. 1.

The air conditioning apparatus for an automotive vehicle according to the present invention comprises an engine 101, a compressor 102, an evaporator 103, engine speed commanding means 104, an after-evaporator air temperature sensor 105, inhibiting means 107, and an external air temperature sensor 106. The engine 101 drives the compressor 102 to compress a refrigerant. The refrigerant compressed by the compressor 102 is evaporated by the evaporator 103. The engine speed commanding means 104 outputs a first engine speed command signal to the engine 101 to set the engine speed to a first speed when the compressor is not actuated, and a second engine speed command signal thereto to set the engine speed to a second speed (higher than the first speed) when the compressor is being actuated. The after-evaporation air temperature sensor 105 detects the air temperature immediately after the evaporator. The external air temperature sensor 106 detects temperature of external air. The inhibiting means 107 inhibits the engine speed commanding means 104 from outputting the second engine speed command signal to the engine 101, when the detected after-evaporator air temperature is lower than a predetermined value and further the external air temperature is lower than another predetermined value, even if the compressor is being actuated.

Further, it is preferable to allow the engine speed commanding means 104 to output a third engine speed command signal to the engine 101 so that the engine idle speed can be increased higher than the second engine speed, when the compressor is being actuated and further thermal load of the automotive vehicle is larger than a predetermined value.

In the air conditioning apparatus as shown in FIG. 1, when the after evaporator air temperature is lower than a predetermined value and further the external temperature is lower than another predetermined value, the engine idle speed is controlled at a speed the same as when the compressor is not actuated. In other words, the fact that the after-evaporator temperature is lower than a predetermined value indicates that the compressor has been already actuated and the cooling time has elapsed to some extent so that the cooling operation is in steady state. Under these conditions, if the external air temperature is lower than a predetermined value, since no strong cooling operation is required, the engine idle speed is not increased even when the compressor is being actuated.

Further, when the compressor is being actuated and further the thermal load of the vehicle is higher than a predetermined value, since the engine idle speed is set to the third engine speed higher than the second engine idle speed, it is possible to obtain a sufficient cooling power for a high thermal load of the vehicle.

Figure 2:
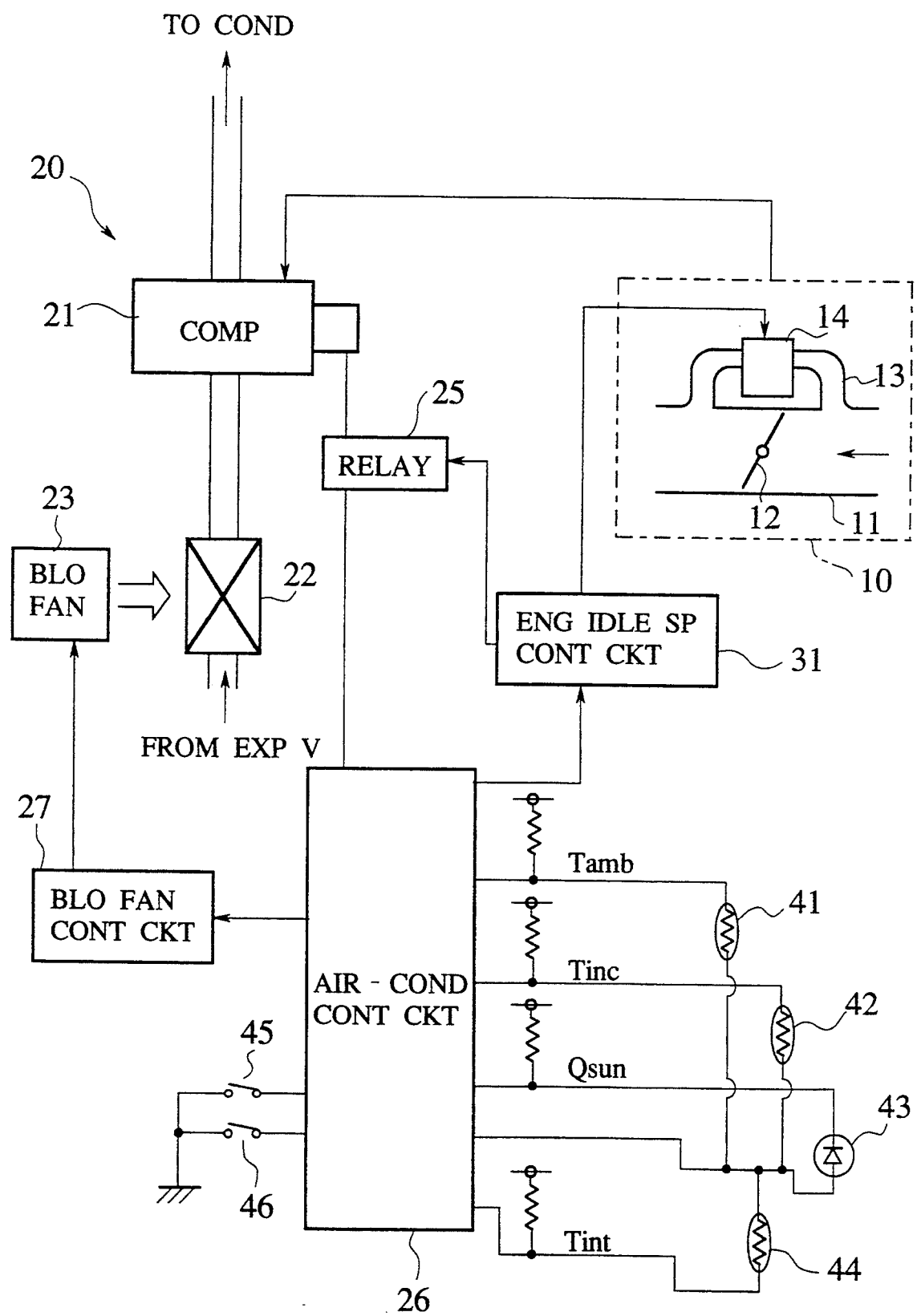
FIG. 2 is an overall apparatus construction of an embodiment of the present invention.

FIG. 2 shows a more practical apparatus construction of the embodiment of the present invention. In FIG. 2, a throttle valve 12 is provided in an intake air passage 11 of an engine 10 (101). An AAC (auxiliary air flow rate control) valve 14 is disposed in a bypass passage 13 which bypasses the throttle valve 12, to adjust the auxiliary air flow rate passed through the bypass passage 18. The opening rate of the AAC valve 14 is controlled by an engine idle speed control circuit 31 (104). That is, the engine idle speed is controlled by adjusting the auxiliary air flow rate on the basis of the engine operating conditions or in response to the command signal applied by an air condition control circuit 26 (described later).

An air conditioning apparatus 20 according to the present invention comprises a compressor 21 (102) driven by the engine 10, an evaporator 22 (103), and a blower fan 23. The evaporator 22 evaporates an refrigerant compressed by the compressor 21 and fed through a condenser, liquid tank an expansion valve (all not shown) to cool air passed therethrough. The blower fan 23 blows out external or internal air introduced through an air inlet into a vehicle room through the evaporator 22. Further, the compressor 21 is actuated or not actuated in response to a command signal supplied by the air condition control circuit 26 via a relay 25.

To the air condition control circuit 26, there are connected an external air temperature sensor 41 (106) for detecting external (ambient) air temperature Tamb, a room temperature sensor 42 for detecting vehicle room temperature Tinc, a solar radiation sensor 43 for detecting the quantity of solar radiation Qsun, an after-evaporator air temperature sensor 44 (105) for detecting air temperature Tint immediately after the evaporator 22, an air conditioner switch 45 turned on to actuate the compressor 21, and a fan switch 46 for switching the speed of the blower fan 23 manually. In FIG. 2, although only a single fan switch 46 is shown, a plurality of fan switches are provided in practice.

The air condition control circuit 26 controls the actuation or deactuation of the compressor 21 via the relay 35 and the speed (i.e., the amount of air) of the blower fan 28 via a blower fan control circuit 27, on the basis of the on- or off-status of the air conditioner switch 45 or the blower fan switch 46 and according to the vehicle thermal load. In addition, the air condition control circuit 26 determines a command value of the engine idle speed according to the external air temperature Tamb and the after-evaporator air temperature Tint, and outputs the determined command signal to the idle speed control circuit 31.

Here, the air condition control circuit 26 corresponds to the engine speed commanding means 104 and the inhibiting means 107 both shown in FIG. 1.

Figure 3:
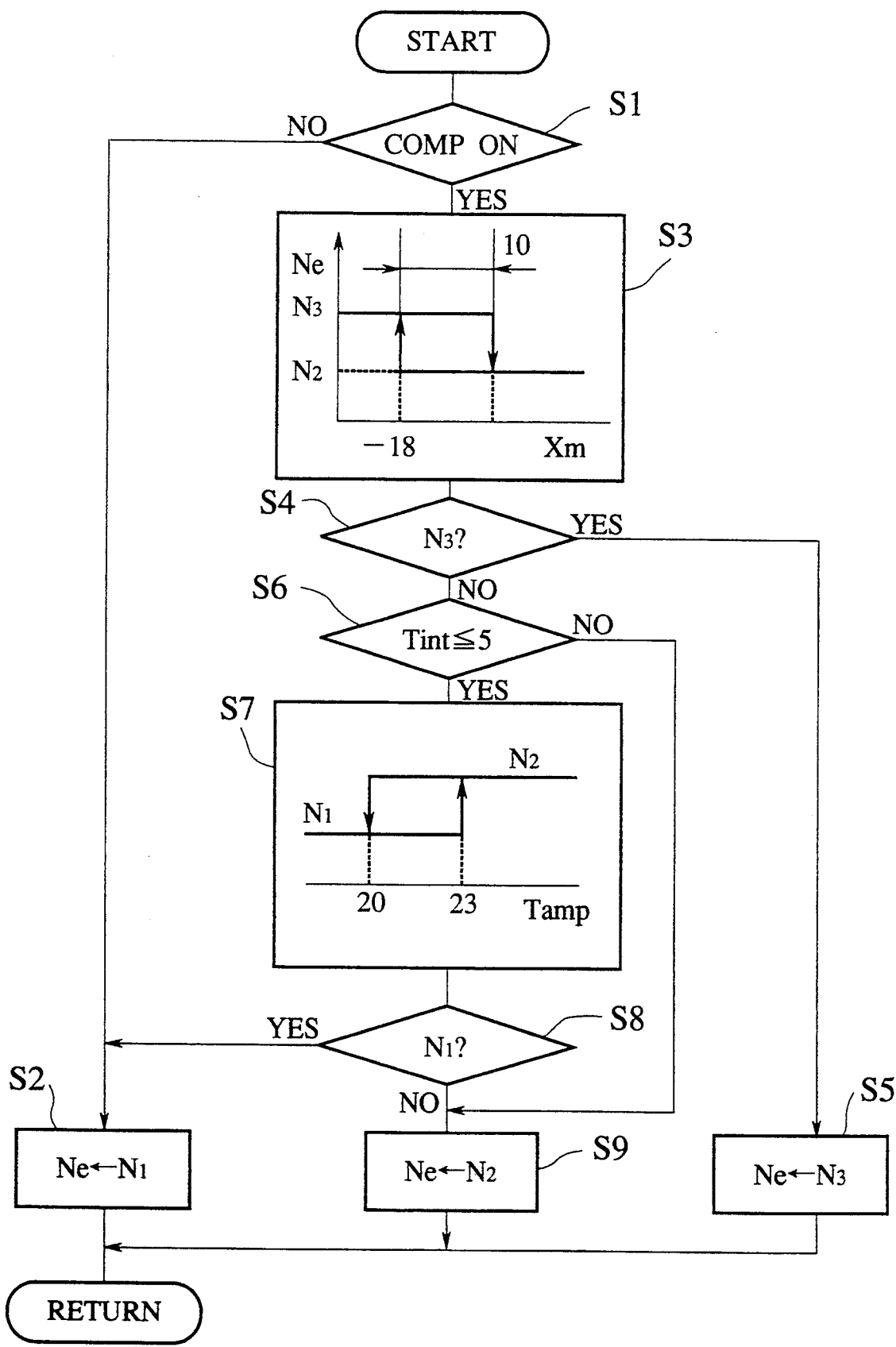
Figure 4:
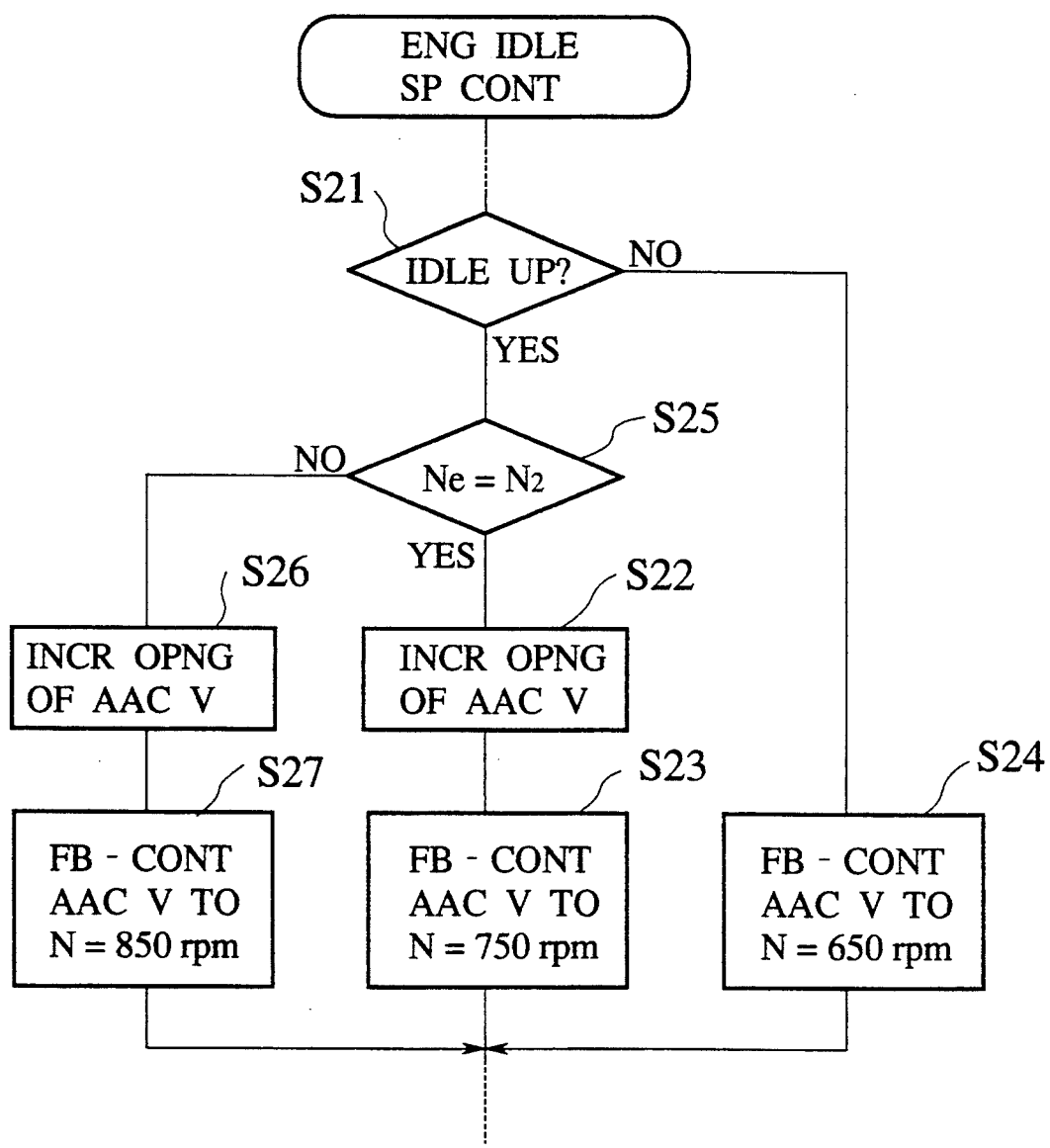
FIG. 4 is a flowchart for assistance in explaining the procedure of adjusting actual engine idle speeds.

With reference to FIGS. 3 and 4, the engine idle speed control procedure of the present invention will be described hereinbelow.

FIG. 3 shows the control procedure of the air condition control circuit 26. Control (air condition control circuit 26) first checks whether or not the compressor 21 is actuated (in step S1). If not actuated, control sets the idle speed command value Ne to an ordinary idle speed $N_1$ (which corresponds to a first speed of 650 rpm, for instance) obtained when the compressor is not actuated (in step S2). This idle speed command value Ne is inputted to the idle speed control circuit 31 for actual idle speed control (which is described in more detail with reference to FIG. 4).

On the other hand, if the compressor 21 is actuated (in step S1), control proceeds to the succeeding step to decide the command value $N_2$ or $N_3$ on the basis of a target blown-out air temperature Xm and in accordance with the characteristics as shown (in step S3).

The target blown-out air temperature Xm can be calculated as follows:

$$Xm = (A+D)Tptc + B \cdot Tam + C \cdot Q'sun - D \cdot Tinc + E$$

where Tam denotes a value obtained by processing the external temperature Tamb detected by the external air temperature sensor 41 so as to correspond to the actual external temperature by removing the influence of other heat sources; Q'sun denotes the quantity of solar irradiation Qsun detected by the solar radiation sensor 43 and further corrected by a predetermined thermal information; T'ptc denotes an air temperature Tptc set by a passenger with the use of a set switch provided on a control panel and further corrected according to the external air temperature; Tinc denotes the vehicle room temperature detected by the room temperature sensor 42; and A to E denote constants, respectively. Here, the target blown-out air temperature Xm is determined so as to become lower with increasing vehicle thermal load.

Further, In an automatic air conditioning control mode, the actual blown-out air temperature, the blower fan speed, and the blow-out ducts are all controlled on the basis of the target blown-out air temperature. However, since the automatic control mode is not directly related to the present Invention, any detailed description thereof is omitted herein.

Returning to FIG. 3, control discriminates the result decided In step S3 (in step S4), if the decided result is $N_3$ (in step S4), control discriminates that the vehicle thermal load is high and therefore a strong cooling power is required. That is, control sets the engine idle speed command value Ne to an Idle speed $N_3$ (which corresponds to a third speed of 850 rpm, for instance) higher than the first speed $N_1$ (in step S5). On the other hand, if the decided result is $N_2$ (in step S4), control checks whether the after-evaporator evaporator air temperature Tint detected by the after-evaporator air temperature sensor 44 is equal to or lower than a predetermined value (e.g., 5° C.) (in step S6). If the detected temperature Tint is higher than 5° C. :Tint>5° C.), control discriminates that the compressor has just been started and therefore a relatively strong cooling power is required. That is, control sets the engine idle command value Ne to an idle speed $N_2$ (which corresponds to a second speed of 750 rpm, for Instance) intermediate between $N_1$ and $N_3$ (in step S9).

Further, if Tint $\leq 5°$ C. (in step S6), however, control discriminates that a time has elapsed after the compressor started and therefore the cooling power is steady and proceeds to the succeeding step. That is, control sets the engine idle command value Ne to $N_1$ or $N_2$ on the basis of whether or not the external air temperature Tamb is higher than a predetermined value (e.g., 20° C.) and in accordance with the characteristics shown (in step S7). Control discriminates the result decided in step S8. That is, if the decided result is $N_1$, control sets the engine idle speed command value Ne to $N_1$ (in step S2), and if $N_2$, control sets the engine idle speed command value Ne to $N_2$ (in step S9).

FIG. 4 shows a partial procedure of the engine idle speed control by the idle speed control circuit Control first discriminates the idle speed command value Ne inputted by the air condition control circuit 26 (in step S 21). If Ne≠$N_2$, and further Ne≠$N_3$; that is, no idling up operation is effected, the opening rate of the AAC valve 14 is feed-back controlled so that the actual engine idle speed N becomes $N_1$ (650 rpm) (in step S24). On the other hand, if control discriminates the idling up operation (YES in step S21) and further if Ne=$N_2$ (in step S25), the AAC valve 14 is opened to increase the opening rate of the valve 14 by a predetermined value (in step S 22). Further, the opening rate of the AAC valve 14 is feed-back controlled so that the actual engine idle speed N becomes $N_2$ (750 rpm) (in step S23). On the other hand, if $N_e = N_3$ (in step S25), the AAC valve 14 is opened by a constant value to increase the opening rate of the valve 14 by a predetermined value (in step S 26), and the opening rate of the AAC valve 14 is feed-back controlled so that the actual engine idle speed N becomes $N_3$ (850 rpm) (in step S27).

As described above, in the present embodiment, when the target blow-out temperature Xm is higher than a predetermined value, the engine idle speed is controlled on the basis of the after-evaporator temperature Tint and the external air temperature Tamb. In more detail, when the after-evaporator air temperature Tint is higher than 5° C. (the compressor has just been started and therefore a relatively high cooling power is required), the engine idle speed N is set to a relatively high value $N_2$. Further, when the after-evaporator air temperature Tint is lower than 5° C. and the external temperature Tamb is higher than a predetermined value, the engine idle speed N is set to a relatively high value $N_2$. Further, when the after-evaporator air temperature Tint is lower than 5° C. and further the external air temperature Tamb is lower than a predetermined value (the cooling power is steady and additionally the external temperature is relatively low), an increase in the engine idle speed N is inhibited even when the compressor is being actuated, so that the engine idle speed N is set to the ordinary engine idle speed value $N_1$ obtained when the compressor is not actuated. Accordingly, engine idle speed is not increased unnecessarily, thus improving the fuel consumption rate, without use of any timer means.

Further, in this embodiment, when the compressor is being actuated and further the target blown-out air temperature Xm is lower than a predetermined value (the vehicle thermal load is higher than a predetermined value), since the engine idle speed is set to a high speed value $N_3$ further higher than the second speed $N_2$ determined when the compressor is being actuated, it is possible to effectively cool the vehicle room even if the vehicle thermal load is high. Further, in case the engine idle speed $N_2$ is kept under high thermal load, since the cooling power is not sufficient, the blower fan is kept rotated for a long time, thus causing a problem in that the noise is not comfortable for the passenger. In this embodiment, however, since the engine idle speed is set to a higher value $N_3$, it is possible to prevent the blower fan from being kept rotated for many hours, thus reducing the passenger's discomfort due to the blower fan noise.

Further, In FIG. 8, the threshold value for determining the target blown-out air temperature, the reference external temperature value decided by the blower fan speed, etc. are all not limited to only the actual values as disclosed in this specification. Further, the mechanism for adjusting the engine idle speed is not limited to only that as shown in FIG. 2.

As described above, in the air conditioning apparatus according to the present invention, the engine idle speed is not increased, even if the compressor is being actuated, in the case where the after-evaporator air temperature is lower than a predetermined value and further the external temperature is lower than another predetermined value. Therefore, it Is possible to hold the engine idle speed at an appropriate value without use any timer means and further to improve the fuel consumption rate, in spite of a simple control configuration, while reducing the manufacturing cost thereof.

Further, when the compressor is being actuated and further vehicle thermal load exceeds a predetermined value, since the engine idle speed Is further increased, it is possible to obtain a sufficient cooling power even under a relatively high thermal load.

What is claimed is:

1. An air conditioning apparatus for an automotive vehicle, comprising:
   a compressor driven by an engine, for compressing a refrigerant;
   an evaporator for evaporating the refrigerant compressed by said compressor;
   engine speed commanding means for outputting a first command signal to drive the engine at a first engine idle speed when said compressor is not actuated, and outputting a second command signal to drive the engine at a second engine idle speed higher than the first engine idle speed when said compressor is actuated;
   an after-evaporator temperature sensor for detecting air temperature immediately after said evaporator;
   an external air temperature sensor for detecting external air temperature; and
   inhibiting means for inhibiting said engine speed commanding means from outputting the second command signal, when air temperature detected by said after-evaporator temperature sensor is lower than a predetermined temperature and further external air temperature detected by said external temperature sensor is lower than another predetermined temperature, irrespective of whether said compressor is actuated or not.

2. The air conditioning apparatus of claim 1, further comprising:
   means for detecting internal air temperature;
   means for detecting quantity of solar radiation;
   means for setting a required room temperature; and
   means for calculating vehicle thermal load on the basis of the detected external and internal air temperatures, after-evaporator temperature and solar radiation, and the set required room temperature;
   wherein said engine speed commanding means outputs a third command signal to drive the engine at a third engine idle speed higher than the second engine idle speed, when said compressor is actuated and further a calculated vehicle thermal exceeds a predetermined value.

3. A method of controlling air temperature within a vehicle room, comprising the steps of:
   checking whether a compressor is actuated or not;
   if the compressor is not actuated, setting engine idle speed to a first engine idle speed $N_1$;
   if the compressor is actuated, detecting after-evaporator temperature Tint;
   comparing the detected after-evaporator temperature with a predetermined value;
   if the detected after-evaporator temperature is higher than the predetermined value, setting engine idle speed to the second engine idle speed $N_2$ higher than the first engine idle speed;
   if the detected after-evaporator temperature is equal to or lower than the predetermined value;
   detecting external air temperature Tamb;
   comparing the detected external air temperature with another predetermined value;

if the detected external air temperature is higher than the predetermined value, setting engine idle speed to the second engine idle speed $N_2$; and if the detected external air temperature is lower than the predetermined value, setting engine idle speed to the first engine idle speed $N_1$ even if the compressor is being actuated.

4. The method of controlling air temperature within a vehicle room of claim 3, which further comprises the steps of:

detecting internal air temperature;

detecting quantity of solar radiation;

setting a required room temperature;

calculating vehicle thermal load on the basis of the detected external and internal air temperatures, after-evaporator temperature and solar radiation, and the set required room temperature;

comparing the calculated vehicle thermal load with a predetermined value;

if the calculated vehicle thermal load is higher than the predetermined value, setting engine idle speed to a third engine idle speed higher than the second engine idle speed, as far as the compressor is being actuated.

* * * * *